Sept. 12, 1967  T. STRAUSS ET AL  3,340,898
PRESSURE DIFFERENTIAL RESPONSIVE VALVE MEANS
Original Filed July 27, 1962
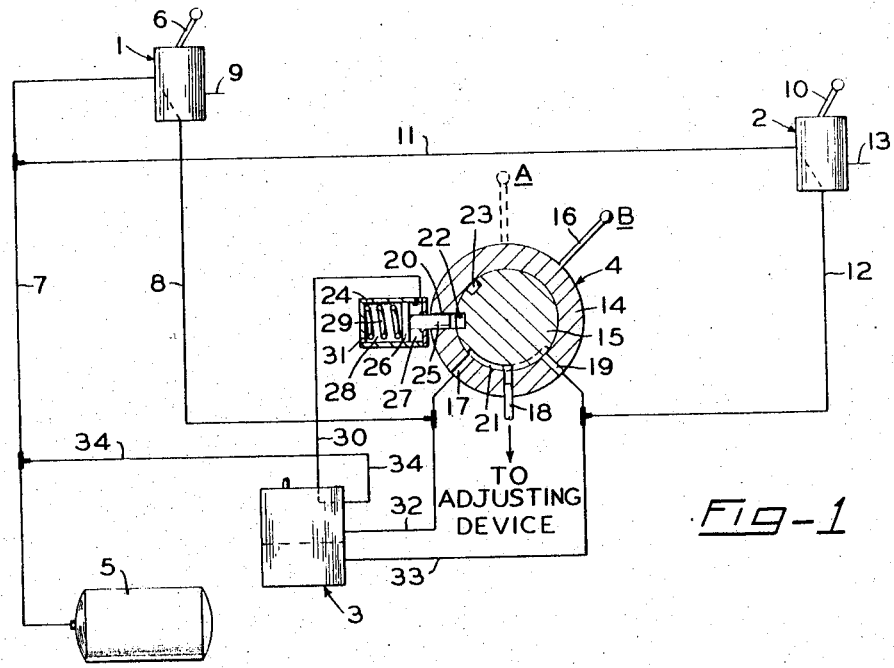
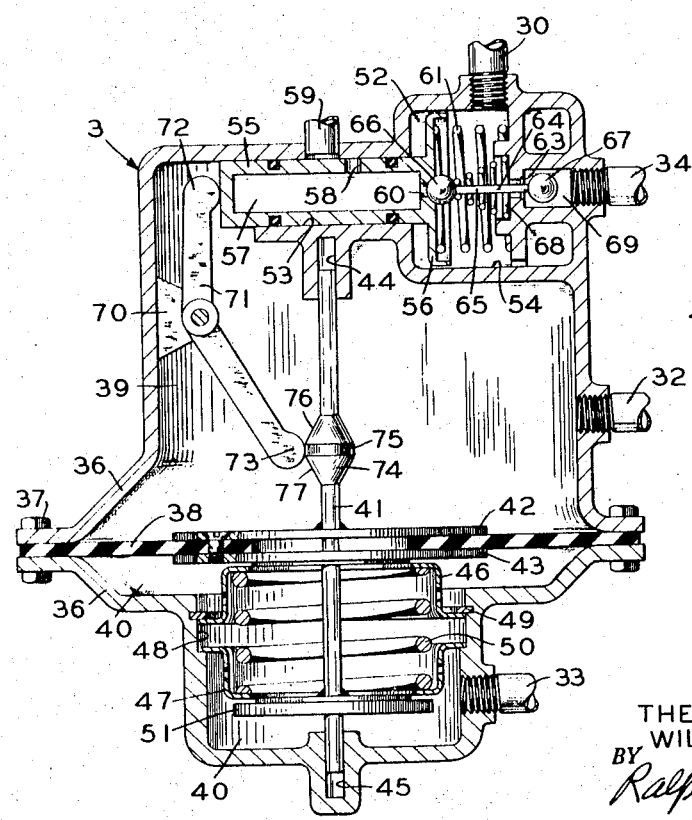
INVENTORS
THEODOR STRAUSS
WILHELM BACHMANN
BY Ralph W. McIntire, Jr.
ATTORNEY United States Patent Office 3,340,898
Patented Sept. 12, 1967

3,340,898
PRESSURE DIFFERENTIAL RESPONSIVE
VALVE MEANS
Theodor Strauss, Berenbostel, Hannover, and Wilhelm Bachmann, Godshorn, Hannover, Germany, assignors to Westinghouse-Bremsen-Gesellschaft, m.b.H., Hannover, Germany
Original application July 27, 1962, Ser. No. 212,995, now Patent No. 3,165,121, dated Jan. 12, 1965. Divided and this application Oct. 26, 1964, Ser. No. 406,345
Claims priority, application Germany, Nov. 3, 1961, W 31,009
4 Claims. (Cl. 137—627.5)

ABSTRACT OF THE DISCLOSURE

A pressure differential responsive valve means having a diaphragm subjectable on opposite sides respectively to separate control pressures and operative to cause supply of fluid under pressure to a receiver only when the separate pressures are substantially equal, and operative to cause venting of fluid under pressure from the receiver whenever the separate pressures are unequal.

The present application is a division of the copending application, now Patent 3,165,121, issued Jan. 12, 1965 and assigned to the same assignee.

In the propulsion of ships, it is common practice to control the angle of incidence of the propeller blades either pneumatically or hydraulically to thereby control direction of travel and speed of the ship. This control of the propeller occurs by means of a pressure actuated adjusting device which is usually located in the propeller shaft alley and controlled by a plurality of control valves, one of which is located on the bridge control stand and the other is located on the engine room control stand. The selection of the operating control valve to be effective is under the control of a multiple position cock or similar device usually located in the engine room which operably connects either the one control valve or the other control valve with the adjusting device.

By means of this arrangement just described, it is possible that control of the adjusting device may be attempted to be applied undesirably by both control valves simultaneously. For example, if an attempt be made to operate the control valve on the bridge control stand to give a propeller angle of incidence of a positive angle, and concurrently the control valve on the engine room control stand be operated to adjust the angle of incidence of the propeller to a negative angle, a severe damaging shock on the driving engines and the propeller shaft and gears associated therewith would occur.

The present invention provides a presure differential responsive valve for preventing changeover of the multiple position cock unless the control pressures supplied by both of the control valves are equalized.

According to the present invention, there is provided an equal pressure valve for use in a multiple station control apparatus whereby a manually operated rotatable plug valve of a multiple position cock is locked in one position if the fluid pressures which are supplied thereto by two control valves are of unequal degree as determined by said equal presure valve, and said plug valve in the multiple position cock body is unlocked and can be repositioned if the fluid pressures supplied thereto are of equal degree as determined by said equal pressure valve. The multiple position cock can therefore be repositioned under the control of the equal pressure valve only when fluid pressures supplied thereto from the two control valves are substantially equal. The equal pressure valve has a diaphragm therein activated on one side by the fluid pressures delivered from one control valve, and on the other side by the fluid pressures delivered from the other control valve in a manner that when the fluid pressures on both sides of said diaphragm are equal, a source of fluid under pressure is connected to a locking cylinder on the body of the multiple position cock to unlock the multiple position cock for changeover operation.

In the accompanying drawings, FIG. 1 is a diagrammatic view of the apparatus showing the two control valves and the multiple position cock under the control of an equal pressure valve.

FIG. 2 is an enlarged diagrammatic sectional view showing details of the equal pressure valve of FIG. 1.

Description

Referirng to FIG. 1, the apparatus includes a bridge control valve 1, an engine room control valve 2, a pressure differential operated valve means referred to hereinafter as an equal pressure valve 3, and a multiple position cock 4, all interconnected by appropriate piping supplied with fluid under pressure from a supply reservoir 5. The bridge control valve 1 is manually operated by a handle 6 whereby supply of fluid under pressure from the reservoir 5 flows from a pipe 7 through said control valve, as indicated by a dotted line, to a pipe 8 at a pressure determined by the positioning of the said handle 6 from a full pressure position shown to another position (not shown) whereby pipe 8 is connected through said control valve to atmosphere at a port 9. The engine room control valve 2 is manually operated by a handle 10 whereby fluid under pressure is supplied from the reservoir 5, pipe 7, a pipe 11, through said control valve, as indicated by a dotted line, to a delivery pipe 12 at a pressure determined by the positioning of the handle 10 from a full pressure position shown to another position where said delivery pipe 12 is connected therethrough to atmosphere at an exhaust port 13.

The multiple position cock 4, in this instance a two-position, three-way cock, includes a valve body 14 and a plug valve 15 whereby said plug valve 15 is rotatably positioned within the valve body by movement of a valve handle 16 connected to the plug valve by means not shown. The valve body 14 is provided with three radial passages 17, 18 and 19, passages 17 and 19 connecting to the delivery pipes 8 and 12, respectively, while passage 18 is connected to a pressure actuated adjusting device (not shown) for adjusting the pitch or angle of incidence of the propeller blades according to the degree of pressure supplied thereto, the details of the adjusting device being not necessary to an understanding of the present invention. Also included in the valve body is a guide slot 20, explained hereinafter. The plug valve 15 has a recessed or feed groove 21 of a length to selectively connect either passages 17 and 18, or passages 18 and 19 (as shown in broken lines), according to the rotative position of said plug valve. Two locking slots 22 and 23, explained hereinafter, are also in the plug valve 15.

Associated with the multiple position cock 4 is a locking cylinder 24 suitably mounted by means (not shown), such that a piston stem 25 of a piston 26 slidably mounted therein may align with the locking groove 20 to extend therethrough into one or the other of the locking slots 22 or 23. The piston 26 in said locking cylinder forms a fluid pressure chamber 27 on one side thereof and a spring chamber 28 on the other side thereof for housing a spring 29. The chamber 27 is connected by a pipe 30 to the equal pressure valve 3. The spring chamber 28 is vented to atmosphere at a port 31 to permit free movement of the piston 26 when subject to fluid under pressure in the chamber 27.

The equal pressure valve 3, besides being connected to the locking cylinder 24 by way of pipe 30 as previously described, is also connected to the passages 17 and 19 in the valve body 14 of the multiple position cock 4 by pipes 32 and 33, respectively, and to the supply reservoir 5 by way of pipe 34 and pipe 7. The equal pressure valve 3 is comprised of a housing 36 divided into two portions joined together by suitable means such as bolts 37 through flanges formed thereon to secure therebetween a diaphragm 38. The diaphragm 38 separates the interior of the housing into two chambers, chamber 39 supplied with fluid under pressure from pipe 32, and chamber 40 supplied with fluid under pressure from pipe 33. An axially movable rod 41 is connected through the center of the diaphragm at two face plates 42 and 43 on either side of said diaphragm, the ends of said rod slidably extending into bores 44 and 45 formed in the housing. The face plates 42 and 43 are secured together with the diaphragm 38 between them by any suitable means such as rivets or screws with either one of said plates being secured to the rod 41 as by welding, to thereby effect transmittal of any movement of the diaphragm to the rod 41. On the lower side of the diaphragm 38 within the chamber 40 are positioned two movable spring cups 46 and 47 slidably mounted within a groove 48 in the internal surface of the housing and secured therein by a snap ring 49. Interposed between the two spring cups under compression and encircling the rod 41 is a spring 50 which exerts a biasing force outwardly on the spring cups in a manner to position the spring cups at the outer edges of the groove 48 to maintain the diaphragm 38 in its centered position as shown. A locking plate 51 encircles the rod 41 below one of the spring cups 47 and is secured to said rod such that raising movement of said rod will be opposed by the spring 50 acting against the spring cup 47 and locking plate 51. Lowering movement of the rod 41 is opposed by the spring 50 acting against the spring cup 46 and face plate 43.

A third chamber identified herein as the regulating chamber 52 is formed within the chamber 39 on the upper portion of the housing 36, said chamber comprising a slide valve bore 53 and a spring chamber 54. Slidably positioned within the slide valve bore 53 is a hollow piston stem 55 of a piston 56. The hollow piston stem 55 acts as a slide valve in the bore 53 and contains a chamber 57 with an outlet 58 on the sliding portion of said stem to positionably align with an exhaust port 59 in the housing 36 when the piston and piston stem are moved to their left-most position, as shown in the drawing and explained hereinafter. The chamber 57 also has an outlet or exhaust port 60 in the face of the piston 56 which opens into the spring chamber 54. A spring 61 is interposed between the face of the piston 56 and a portion of the housing 36. An intake port 63 is also formed in portion of the housing 36. An intake and exhaust valve 64 is located in the spring chamber and comprises a stem 65 with an exhaust valve ball 66 on one end thereof adaptable to seat in the port 60 in the face of the piston 56 and an intake valve ball 67 on the other end of the stem 65 adaptable to seat in the intake port 63. A spring 68 biases the intake and exhaust valve towards the face of the piston or in a left-hand direction as seen in the drawing. Intake chamber 69 connects the intake port 63 to the pipe 34.

Suitably attached to the housing 36 to the left of the piston 56 and hollow piston stem 55 is a pivot mounting 70 to which is pivotally secured a two-arm crank lever 71. The upper end of the two-arm lever 71 is formed in a ball-shaped knob 72 to abut the end of the piston stem 55. The lower arm of the two-arm lever 71 is formed in a ball-shaped knob 73 to ride on a two-surface cam 74 on rod 41. Cam 74 has a high surface 75 with two tapered surfaces on either side of the high surface 75 decreasing in diameter towards the diameter of the rod 41. The upper tapered surface is identified as surface 76, the lower tapered surface being surface 77. This cam is securely mounted in an encircling manner about the rod 41 for operational purposes described hereinafter.

*Operation*

In operation, the apparatus shown in FIG. 1 is supplied with fluid under pressure from the charged reservoir 5 via the pipe 7 and through both the bridge control valve 1 and the engine room control valve 2 via pipe 11 when both said control valves 1 and 2 are in their respective full pressure positions as shown, with handles 6 and 10 in their right-hand positions. With the handles 6 and 10 positioned as just described, equal fluid pressures are supplied by pipes 8 and 12 to pipes 32 and 33 respectively, thereby effecting an equal fluid pressure supply to chambers 39 and 40 on opposite sides of the diaphragm 38 of the equal pressure valve 3. With equal pressures in the chambers 39 and 40, the equal pressure valve 3 is centrally positioned, as shown, to establish communication between the pipes 34 and 30 in a manner now described. Equal pressure on opposite sides of the diaphragm 38 permits the spring 50 between the spring cups 46 and 47 to position the diaphragm and connected axial rod 41 to a center position as shown, wherein the high surface 75 of the cam 74 on the rod 41 engages the ball-shaped knob 73 of the lower arm of crank lever 71. With the high surface 75 of the cam 74 engaging the crank lever 71, said crank lever is pivoted clockwise about the pivot mounting 70 in a manner that the ball-shaped knob 72 engages the hollow piston stem 55 of piston 56 and moves said piston and stem to a right-hand position against the force of spring 61, as shown. With the piston 56 in its right-hand position, the face of the piston 56 engages the exhaust valve ball 66 at the port 60 to close said port 60 and also move the entire intake and exhaust valve 64 to the right against the force of the spring 68 to move the intake valve ball 67 away from the intake passage 63 to thereby permit fluid under pressure to flow from the reservoir 5, pipe 7 and pipe 34, through the chamber 69, passage 63 and chamber 54 to the pipe 30.

Supply of fluid under pressure to pipe 30 as just described establishes a supply of fluid under pressure to the chamber 27 of the locking cylinder 24 to effect movement of the piston 26 and piston stem 25 to a left-hand position, as shown, in opposition to the force of the spring 29. Movement of the piston stem 25 leftward in the guide slot 20 of the valve body 14 of the multiple position cock 4 releases the said piston stem from seating in one or the other of the locking slots 22 or 23 such that the plug valve 15 may be rotated to either position A or B (indicated at the handle 16) as desired to supply fluid under pressure to passage 18 selectively from either passage 17 or 19 and feed groove 21.

Although the handles 6 and 10 are shown and described herein as in their respective full pressure positions, operation of the equal pressure valve 3 to supply fluid under pressure to the locking cylinder 24 can be effected in a like manner regardless of the positioning of the two handles 6 and 10, as long as they are both positioned to supply equal fluid pressures. For example, assume the pressures of fluid supplied to the pipes 8 and 12 are decreased from a pressure of say 60 p.s.i. toward a zero pressure as the handles 6 and 10, respectively, are moved to the left in a counterclockwise motion. Also assume a pressure of 10 p.s.i. supplied to the passage 18 of the multiple position cock would cause the adjusting device (not shown) to cause the propeller pitch to be at one extreme angle of incidence indicating a full ahead speed, and a pressure of 60 p.s.i. supplied to the passage 18 of the multiple position cock would cause the adjusting device to cause the propeller pitch to be at an opposite extreme angle of incidence indicating a full astern speed, with the angle of incidence adjustable from one extreme (full ahead) to the opposite (full astern) as the fluid pressure supplied to passage 18 is increased. Thus, if both handles 6 and 10 were at any like positions supplying any equal pressures, the multiple position cock could be rotated to shift control from the engine room to the bridge and vice versa. If, however, one of the handles, say handle 6, is positioned to supply a low fluid pressure (which would result in a high speed forward), and the handle 10 were positioned to supply a high fluid pressure (which would result in a high speed astern), the unequal pressures supplied to the equal pressure valve would prevent movement of the multiple position cock and thereby prevent shifting of control from one control valve to the other, in a manner now described.

If the fluid pressures supplied to the pipes 32 and 33 are unequal, it can be seen that the fluid pressures in the chambers 39 and 40 will likewise be unequal to cause the diaphragm 38 and connected rod 41 to be moved vertically either upward or downward, dependent on which of the fluid pressure in the chambers 39 and 40 predominates. The resultant vertical movement of the rod 41 and cam 74 will permit the ball-shaped knob 73 of the lever 71 to ride down one or the other of the tapered surfaces 76 or 77 of the cam 74, dependent on the direction of vertical movement of the rod 41, to cause counterclockwise rotation of the lever 71 due to the force of the spring 61 acting leftward through the piston 56 against the ball-shaped knob 72 on the lever 71.

When the lever 71 moves counterclockwise as just described, the piston 56 simultaneously moves to a left-hand position in which a series of different events occur simultaneously, as follows:

(a) the spring 68 acting on the exhaust valve ball 66 moves the intake and exhaust valve 64 to the left with the moving piston 56 until the intake valve ball 67 seats in the passage 63 to prevent further supply of fluid under pressure therethrough, (b) once the intake valve ball 67 is seated, continued movement to the left of the piston 56 by the spring 61 moves the piston face and the passage 60 therein away from the exhaust valve ball 66 to open the passage 60 between the chamber 54 and the chamber 57 in the piston stem 55, and (c) the outlet 58 in the piston stem 55 aligns with the exhaust port 59 in the housing 36.

It can thus be seen that the leftward movement of the piston 56 effects cutoff of the supply of fluid under pressure from pipe 34 to the chamber 27 of the locking cylinder 24 and simultaneously effects venting of said chamber to atmosphere by way of pipe 30, chamber 54, passage 60, chamber 57, outlet 58 and port 59.

With chamber 27 of the locking cylinder 24 vented, the spring 29 moves the piston 26 to the right thereby moving the stem 25 through the groove 20 to seat in either one of the locking grooves 22 or 23, determined by positioning of the plug valve 15 by rotary movement of the handle 16, to cause the plug valve 15 to be locked in the position desired.

Rotary movement of the plug valve 15 can thus be effected only when the handles 6 and 10 of the respective control valves 1 and 2 are positioned to supply fluid under equal pressures to the respective pipes 32 and 33 to in turn reposition the diaphragm 38 of the equal pressure valve 3 to its central position described hereinbefore.

Although this apparatus is described herein as utilized in a control system adapted to shipboard operation, it can be seen that it could be readily adapted for other control systems for other adjusting devices, as for example motor controls in locomotives with two engineer's control stations.

Having now described the invention, what we claim as new and desire to secure by Letters Patent, is:

1. Pressure differential operated valve apparatus comprising:
    (a) a valve body having a fluid pressure supply port, a fluid pressure delivery port and a fluid pressure vent port,
    (b) diaphragm means secured in said valve body and subject to fluid under pressure from one source on one side and subject to fluid under pressure from a second source on the other side, said diaphragm means being operably responsive to equal fluid pressures on said one side and said other side to assume one position operably responsive to a greater fluid pressure on said one side than on said other side to assume a second position, and operably responsive to a greater pressure on said other side than on said one side to assume a third position,
    (c) valve means operable to one position to establish communication via which fluid under pressure is supplied from said supply port to said delivery port and operable to a second position to establish communication via which fluid under pressure flows from said delivery port to said vent port,
    (d) rod means coaxially connected to and extending through said diaphragm means in a manner that movement of said diaphragm means is transmitted to said rod means, and
    (e) position transmitting means operable responsively to movement of said rod means and effective when said diaphragm means is in said one position to cause positioning of said valve means in its said one position and effective when said diaphragm means is in said second or third position to cause positioning of said valve means in its said second position.

2. Pressure differential operated valve apparatus comprising:
    (a) valve body means having a fluid pressure supply port, a fluid pressure delivery port, and a fluid pressure vent port,
    (b) diaphragm means secured in said valve body and subject to fluid under pressure from one source on one side and subject to fluid under pressure from a second source on the other side, said diaphragm means being operably responsive to equal fluid pressures on said one side and said other side to assume one position operably responsive to a greater fluid pressure on said one side than on said other side to assume a second position,
    (c) valve means operable to one position to establish a fluid pressure supply communication via which fluid under pressure is supplied from said supply port to said delivery port and operable to a second position to establish communication via which fluid under pressure flows from said delivery port to said vent port,
    (d) two-armed lever means pivotably secured within said valve body means abutting said valve means at a first arm,
    (e) rod means coaxially connected to and extending through said diaphragm means in a manner that movement of said diaphragm is transmitted to said rod means, and
    (f) cam means connected to said rod means, said cam means abutting a second arm of said lever means and effective when said diaphragm means is in said one position to cause positioning of said valve means in its said one position and effective when said diaphragm means is in said second position to cause positioning of said valve means in its said second position.

3. Pressure differential operated valve apparatus, as claimed in claim 2, further characterized by a spring means abutting said valve means to position said valve means in said second position when said diaphragm means and connected rod means are in their said second position.

4. Pressure differential operated valve apparatus comprising:
    (a) valve body means having a fluid pressure supply port, a fluid pressure delivery port, and a fluid pressure vent port,
(b) diaphragm means secured in said valve body means and subject to fluid under pressure from one source on one side and subject to fluid under pressure from a second source on the other side, said diaphragm means being operably responsive to equal fluid pressures on said one side and said other side to assume one position and being operably responsive to a greater fluid pressure on said one side than on said other side to assume a second position,
(c) piston and piston stem means,
(d) valve means operable cooperatively with said piston and piston stem means to one postion to establish communication via which fluid under pressure flows from said supply port to said delivery port and operably cooperatively with said piston and piston stem means to a second position to establish communication via which fluid under pressure flows from said delivery port to said vent port,
(e) two-armed lever means pivotally mounted within said valve body means abutting said piston and piston stem means at a first arm,
(f) rod means coaxially connected to and extending through said diaphragm means in manner that movement of said diaphragm is transmitted to said rod means, and
(g) cam means connected to said rod means, said cam means abutting a second arm of said lever means and effective when said diaphragm means and connected rod means are in said one position to cause positioning of said piston and piston stem means and said valve means in their said one position effective when said diaphragm means and connected rod means are in said second position to cause positioning of said piston and piston stem means and said valve member means in their said second position.

References Cited
UNITED STATES PATENTS

| | | |
|---|---|---|
| 2,659,203 | 11/1953 | Carlson. |
| 2,664,915 | 1/1954 | Drinker. |
| 3,018,797 | 1/1962 | Parks _____ 137—627.5 |

CLARANCE R. GORDON, *Primary Examiner.*